United States Patent
Hiramoto et al.

[11] Patent Number: 6,162,470
[45] Date of Patent: Dec. 19, 2000

[54] METHOD FOR REDUCING OR ELIMINATING THE ODOR OF ANIMAL EXCRETA, COMPOUNDING INGREDIENT TO BE USED IN THE METHOD AND FEEDS, PET FOODS OR FOODS CONTAINING THE COMPOUNDING INGREDIENT

[75] Inventors: Tadahiro Hiramoto; Kazuhisa Tachibana; Hiromitsu Motoyama, all of Kanagawa, Japan

[73] Assignee: Takasago International Corporation, Tokyo, Japan

[21] Appl. No.: 09/368,421

[22] Filed: Aug. 5, 1999

[30] Foreign Application Priority Data

Aug. 5, 1998 [JP] Japan .................................. 10-253173

[51] Int. Cl.⁷ ...................................................... A23K 1/18
[52] U.S. Cl. ............................. 426/2; 426/805; 426/807; 426/53
[58] Field of Search ................................. 426/2, 53, 807, 426/805

[56] References Cited

U.S. PATENT DOCUMENTS 5,804,170  9/1998  Negishi et al. ............................. 424/65

FOREIGN PATENT DOCUMENTS

0128333 A2  12/1984  European Pat. Off. .
842610      5/1998   European Pat. Off. .
03019656    1/1991   Japan .
09038183    2/1997   Japan .
10212221    8/1998   Japan .

OTHER PUBLICATIONS

JP 57206391—Abstract—vol. 007, No. 056 (C–155) (1983).

JP 07194315—Abstract—vol. 1995, No. 11 (1995).

XP–002122367—"Effect of Polyphenol Oxidase on Deodorization", (1997).

*Primary Examiner*—Chhaya D. Sayala
*Attorney, Agent, or Firm*—Sughrue, Mion, Zinn, Macpeak & Seas PLLC

[57] ABSTRACT

A method for more fundamentally reducing or eliminating the odor of animal excreta (feces, urine, etc.) which can be relatively easily performed and is advantageous economically; a compounding ingredient to be used in this method; and feeds, pet foods or foods containing the above compounding ingredient are disclosed. The feeds, pet foods or foods contain a compounding ingredient which comprises one or more extracts selected from the group consisting of the extracts of rosemary, sunflower seeds, fresh coffee beans, grape pericarp, grape seeds, apple, carrot leaves and tea leaves and an enzyme capable of oxidizing phenolic compounds.

12 Claims, 1 Drawing Sheet

METHOD FOR REDUCING OR ELIMINATING THE ODOR OF ANIMAL EXCRETA, COMPOUNDING INGREDIENT TO BE USED IN THE METHOD AND FEEDS, PET FOODS OR FOODS CONTAINING THE COMPOUNDING INGREDIENT

FIELD OF THE INVENTION

This invention relates to a method for reducing or eliminating the odor of animal excreta, a compounding ingredient to be used in this method and feeds, pet foods or foods containing the compounding ingredient.

BACKGROUND OF THE INVENTION

There have been employed for a long time deodorizers and deodorants to reduce the odor of the excreta of living organisms, in particular, domestic and pet animals. However, these methods, which comprise spraying deodorizers or deodorants over the excreta of domestic or pet animals per se or around the same to thereby reduce the odor thereof, can achieve only temporary effects and thus the problem cannot be fundamentally solved thereby.

As more fundamental methods for reducing the odor of the excreta of domestic or pet animals, it is proposed to reduce the odor of the excreta per se. For example, it is known to feed domestic or pet animals with feeds containing compounds or compositions having a good smell (lemon oil, orange oil, lime oil, clove oil, vanillin, etc.), or with feeds containing inorganic matters (zeolite, etc.) or microorganisms (lactic acid bacteria). Although these methods are effective each at a certain extent, they still suffer from some problems to be overcome, for example, insufficient deodorizing effects, difficulties in preparation and economical disadvantage.

With the recent tendency toward the aging society throughout the world, in particular, in so-called developed countries, the ratio of the aged to the whole population has been increasing. As a result, there have been also increasing sickly old people and bedridden ones who should be taken care in bodily needs by care workers. Under these circumstances, it would be a great joy for all of the persons concerned to establish a method for reducing or eliminating the odor of human excreta.

Accordingly, an object of the present invention is to provide a more effective deodorizing method which can be relatively easily performed and meets the economical requirements. Another object of the present invention is to provide a compounding ingredient usable in carrying out the above method. Another object of the present invention is to provide feeds, pet foods or foods containing the above-described compounding ingredient.

The present inventors have paid their attention to the fact that various phenolic compounds have deodorizing effects and conducted extensive studies on these compounds, thus completing the present invention.

SUMMARY OF THE INVENTION

Accordingly, the present invention provides:

a method for reducing or eliminating the odor of animal excreta characterized by feeding the animal with an edible material containing one or more extracts selected from the group consisting of the extracts of rosemary, sunflower seeds, fresh coffee beans, grape pericarp, grape seeds, apple, carrot leaves and tea leaves and an enzyme capable of oxidizing phenolic compounds;

a compounding ingredient characterized by containing one or more extracts selected from the group consisting of the extracts of rosemary, sunflower seeds, fresh coffee beans, grape pericarp, grape seeds, apple, carrot leaves and tea leaves and an enzyme capable of oxidizing phenolic compounds, or a compounding ingredient enabling the reduction/elimination of the odor of animal excreta; and feeds, pet foods or foods characterized by containing the above-described compounding ingredient.

DETAILED DESCRIPTION OF THE INVENTION

Figure 1:
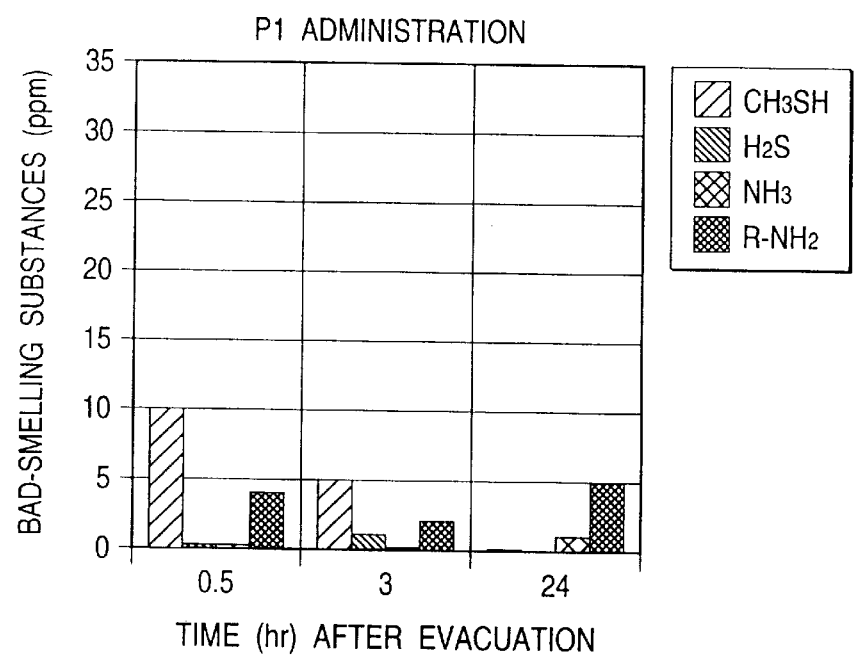
FIG. 1 provides a graph which shows changes with the passage of time in the contents of bad-smelling substances in dog feces after taking pet foods containing the compounding ingredient according to the present invention.

Now, the present invention will be described in detail.

The odor of animal excreta can be reduced or eliminated by feeding the animal with an edible material containing the compounding ingredient as will be described hereinbelow. Thus, a highly remarkable effect of reducing or eliminating the odor of the animal excreta can be established.

One of the components constituting the compounding ingredient according to the present invention comprises one or more extracts selected from the group consisting of the extracts of rosemary, sunflower seeds, fresh coffee beans, grape pericarp, grape seeds, apple, carrot leaves and tea leaves, i.e., extract(s) obtained from plants which are rich in phenolic compounds.

This extract may be obtained by an arbitrary method without restriction. However, it is preferable to employ therefor a safe method suitable for the production of foods, since the extract is to be taken by domestic or pet animals or even by humans such as the aged. Particularly speaking, such an extract can be obtained by bringing a material selected from the group consisting of rosemary, sunflower seeds, fresh coffee beans, grape pericarp, grape seeds, apple, carrot leaves and tea leaves into contact with a solvent and, after a certain period of time, recovering the solvent.

Still preferable results can be achieved by pretreating the vegetable material selected from the group consisting of the rosemary, sunflower seeds, fresh coffee beans, grape pericarp, grape seeds, apple, carrot leaves and tea leaves, before the contact with a solvent.

Examples of the pretreatment involve drying, using a marketed product having been dried and cutting into small pieces.

Preferable examples of the solvent usable herein include water, alcohols, organic solvents and mixtures thereof. More particularly speaking, favorable results can be obtained by using water, ethanol, propanol, butanol, acetone, hexane, propylene glycol, aqueous ethanol, aqueous propylene glycol, etc.

The above-described extract, which is the first component to be used in the present invention, includes those obtained by processing the extracts prepared by the above methods. As these processed products, powders, in particular, dried powders are preferable. Also, the plants per se before the extraction treatment fall within the category of the first component according to the present invention.

Another component to be used in the present invention includes enzymes capable of oxidizing phenolic compounds and materials containing these enzymes. Particularly preferable examples thereof include enzymes capable of oxidizing the phenolic compounds as described above into compounds with quinone structure, enzymes having this action together with another action of adding phenolic hydroxyl groups to the phenolic compounds to give quinones, and materials containing these enzymes.

Although arbitrary enzymes having the above-mentioned actions are usable in the present invention, it is efficacious to use, for example, polyphenol oxidase, monophenol oxidase, oxidases forming hydrogen peroxide, peroxidases, etc. It is still preferable to use therefor laccase, tyrosinase, glucose oxidase, peroxidases, etc.

The above-described enzymes or materials containing the same can be obtained by treating plants containing the enzymes by conventional methods. Products obtained by further processing these preparations are also usable in the present invention. It is particularly preferable to use freeze-dried powders therefor.

Examples of the plants containing these enzymes include vegetables and fruits such as apple, pear and burdock. It is also possible to use fungi belonging to the genera Agaricus and Boletus such as mushroom and *Boletus pulverulentus*. It is advantageous to select therefor those being particularly rich in the enzymes from among these plants.

In the present invention, the first component and the second component are added to an edible material which is then taken by an animal. It is assumed that the phenolic compounds contained in the first component are then oxidized by the enzyme contained in the second component to give highly reactive compounds with the quinone structure and then these highly reactive compounds react with bad-smelling substances, thus achieving a deodorizing effect based on the reduction of the bad-smelling substances in the animal body.

The odor of animal excreta can be also reduced or eliminated by giving to the animal the compounding ingredient according to the present invention. For example the first component and the second component are blended with additives for facilitating the intake thereof (for example, sweeteners and flavors) and then the obtained blend is given to the animal, thereby reducing or eliminating the odor of the animal excreta. The blend may be in an arbitrary form, for example, powders or tablets.

The edible material may be an arbitrary one, so long as it can be taken by animals. Examples thereof include so-called foods, feeds and pet foods. The odor of animal excreta is strengthened with the intake of protein. By adding the compounding ingredient according to the present invention to a food with a large protein content, therefore, the odor of the excreta can be reduced or eliminated.

The term "animals" as used herein means any animal capable of taking the above-described compounding ingredient without restriction and examples thereof include pet animals (dog, cat, toy birds, etc.), domestic animals (horse, cow, hen, sheep, etc.) and humans (the young, the aged, etc.).

The first component and the second component may be added to an edible material separately. Alternatively, the first component and the second component may be preliminarily mixed together and then optionally processed followed by the addition to the edible material. For example, it is possible that ingredients commonly employed in the art (carriers, stabilizers, fillers, etc.) are first added to either of the above two components or a mixture thereof and then the resultant mixture is added to the edible material.

With respect to the composition ratio of the second component to the first component, the content of the second component may be varied over a wide range depending on the content of the first component. This is because the first component mainly reacts with bad-smelling substances while the second component seemingly accelerates these reactions. More particularly speaking, the aimed effect of reducing or eliminating the odor can be achieved by using the second component 0.01 to 10 times by weight as much as the first component. The content of the first component in foods, feeds or pet foods generally ranges from about 0.001 to about 50% by weight, preferably from 0.01 to 30% by weight, though it may vary depending on the type of the extract employed.

The foods, feeds, pet foods, etc. containing the compounding ingredient according to the present invention may be given to animals by an arbitrary method without restriction. It is advantageous in many ways to employ conventional methods therefor.

The compounding ingredient of the present invention exhibits a highly remarkable deodorizing (odor-reducing) effect. It is known by experience that the odor of human feces is strengthened on the following morning after having, for example, a garlic-seasoned steak. However, it is clarified that when one takes the compounding ingredient according to the present invention together with a garlic-seasoned steak, the odor of his/her feces on the following morning is considerably reduced. For example, Table 1 shows clearly that the feces (+P1) of a subject who had taken 300 g of seasoned minced beef containing 3 g of garlic and 12 g of the compounding ingredient according to the present invention (P1) wrapped in lettuce leaves on the previous night showed remarkable decreases in the contents of bad-smelling substances, compared with the feces (no P1) of another subject who had taken 300 g of seasoned minced beef containing 3 g of garlic wrapped in lettuce leaves on the previous night.

The contents of the bad-smelling substances were measured by the same method as the one employed in Examples.

TABLE 1

| Time (hr) | $CH_3SH$ (ppm) | | $H_2S$ (ppm) | | $NH_3$ (ppm) | | $R-NH_2$ (ppm) | |
|---|---|---|---|---|---|---|---|---|
| after evacuation | no P1 | + P1 | no P1 | + P1 | No P1 | + P1 | no P1 | + P1 |
| 0.5 | 40.0 | 0.1 | 40.1 | 0.1 | 15.0 | 0.1 | 60.0 | 1.0 |
| 3.0 | 120.0 | 6.0 | 120.0 | 7.0 | 5.0 | 0.0 | 20.0 | 0.0 |
| 24.0 | 36.0 | 0.1 | 36.0 | 1.0 | 2.0 | 0.1 | 8.0 | 0.0 |

(P1 = coffee bean extract + burdock powder)

When animals such as beef cattle are fed with feeds containing the compounding ingredient according to the present invention, moreover, it is expected that the odor of the meat might be reduced, thus giving meat with an improved taste. That is to say, it is assumed that the intake of the compounding ingredient according to the present invention contributes to the considerable reduction of bad-smelling substances in animal bodies, thus reliving the smell of the animals' meat.

The present invention will be described in greater detail by reference to the following Examples, but it should be understood that the invention is not construed as being limited thereto.

EXAMPLE 1 a) Preparation of Fresh Coffee Bean Extract

Fresh coffee beans were lightly roasted (color difference:50) and milled (5 mm-mesh). 1 kg of the milled beans were immersed in 5 l of water and contact was performed at 85 to 95° C. for 2 hours. The thus obtained extract was spray-dried to give 200 g of a powder.

b) Preparation of Compounding Ingredient

A 100 g portion of the powder obtained form the fresh coffee bean powder extract was mixed with 100 g of a crude enzyme preparation originating in burdock to give a compounding ingredient.

c) 1.5 g of the above compounding ingredient was added to 300 g of a dog food (Pedigree Chum Beef: manufactured by Master Food Limited) and well mixed.

d) A female beagle aged 4 years was fed with the above-described dog feed twice a day for 3 days. Subsequently, 301.5 g of the feed containing the deodorizing compounding ingredient prepared above was given to the dog twice a day.

Next, the contents of bad-smelling substances contained in the feces of the clog were measured. The results are shown in Table 2 and FIG. 1.

The contents of bad-smelling substances were measured by the following method.

The evacuated feces (90 g) were introduced in a 6 l plastic bag and stored at 25° C. After the passage of the definite time each as specified in FIG. 1, the gases in the bag were analyzed with a detector tube (manufactured by Gastec) in the order of $CH_3SH$, $H_2S$, $NH_3$ and $R—NH_2$ (wherein $R—NH_2$ stands for amine compounds).

COMPARATIVE EXAMPLE 1

Figure 2:
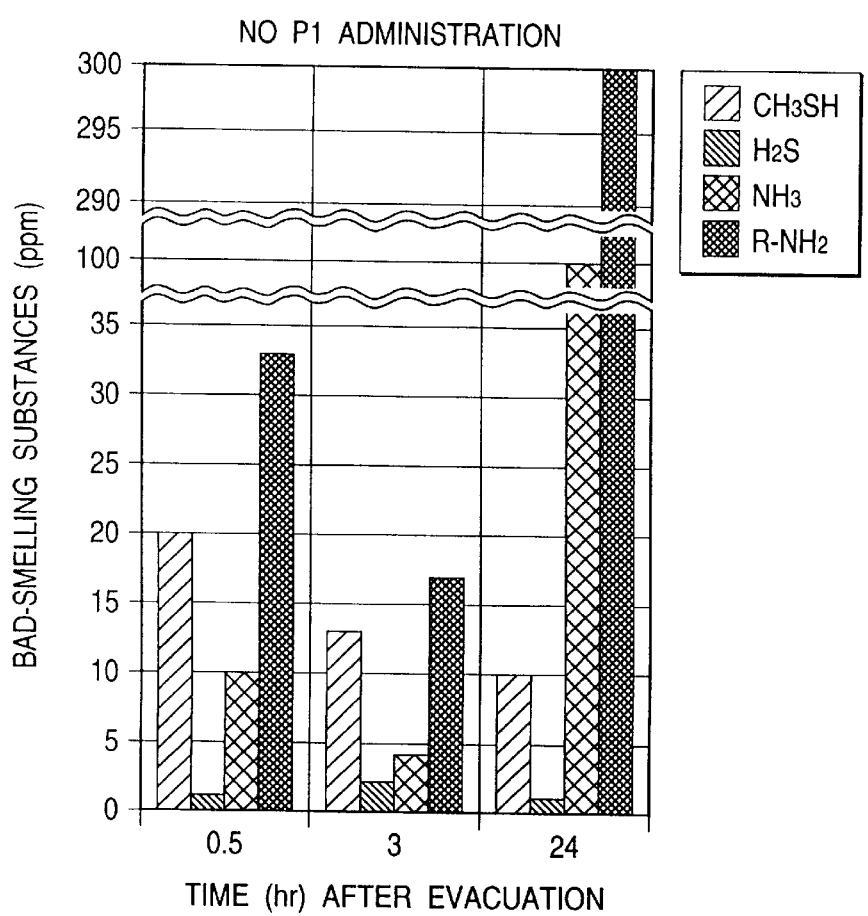
FIG. 2 provides a graph which shows changes with the passage of time in the contents of bad-smelling substances in dog feces after taking pet foods free from the compounding ingredient according to the present invention.

In the above EXAMPLE 1, measurement was made of the contents of the bad-smelling substances in the feces evacuated after feeding the dog with the dog food twice a day for 3 days. The results are shown in Table 2 and FIG. 2.

TABLE 2

| Time (hr) | $CH_3SH$ (ppm) | | $H_2S$ (ppm) | | $NH_3$ (ppm) | | $R—NH_2$ (ppm) | |
| --- | --- | --- | --- | --- | --- | --- | --- | --- |
| after evacuation | no | + | no | + | No | + | no | + |
| | P1 | P1 | P1 | P1 | P1 | P1 | P1 | P1 |
| 0.5 | 20.0 | 10.0 | 1.0 | 0.1 | 10.0 | 0.1 | 33.0 | 4.0 |
| 3.0 | 13.0 | 5.0 | 2.0 | 1.0 | 4.0 | 0.1 | 17.0 | 2.0 |
| 24.0 | 10.0 | 0.1 | 1.0 | 0.0 | 100.0 | 1.0 | 300.0 | 5.0 |

EXAMPLE 2

A compounding ingredient was prepared in the same manner as in Example 1. The dogs listed in Table 3 were fed with the dog food described in Example 1 once or twice (specified in Table 3) a day for 3 days (the step 1). Subsequently, the feed containing the compounding ingredient was given to the animals continuously for 7 days (the step 2) and the odors of the feces during this period were sensorily evaluated during this period. Table 3 summarizes the results.

The evaluation method is as follows.

The odor of the feces on the day 3 in the first step was employed as the standard. The next day of the first administration of the feed containing the compounding ingredient (the step 2) was referred to as the day 1. Then the odors of the feces (immediately after evacuation) were evaluated in the subsequent 7 days.

The evaluation was made in 7 ranks including "highly strengthened", "strengthened", "somewhat strengthened", "no change", "somewhat weakened", "weakened" and "highly weakened".

TABLE 3

(P1 = coffee bean extract + burdock powder)

| Type Age | Sex | Single dose No. of meals | P-1 content | Step 2 day 1 | Step 2 day 2 | Step 2 day 3 | Step 2 day 4 | Step 2 day 5 | Step 2 day 6 | Step 2 day 7 |
| --- | --- | --- | --- | --- | --- | --- | --- | --- | --- | --- |
| Shiba-based mongrel 11 | F | 400–800 g 1 | 0.01% | no change | No Change | somewhat weakened | weakened | highly weakened | highly weakened | highly weakened |
| Mongrel 7 | F | 200 g 2 | 0.01% | no change | No Change | somewhat weakened | somewhat weakened | somewhat weakened | weakened | weakened |
| Welsh corgi 7 | M | 400 g 1 | 0.07% | somewhat strengthened | Highly Weakened | highly weakened | highly weakened | highly weakened | highly weakened | highly weakened |
| Beagle 4 | F | 300 g 2 | 0.50% | weakened | Highly Weakened | highly weakened | highly weakened | highly weakened | highly weakened | highly weakened |
| Shiba-based mongrel 10 | M | 400 g 1 | 0.50% | highly weakened | highly weakened | highly weakened | highly weakened | highly weakened | highly weakened | highly weakened |

(P1 = coffee bean extract + burdock powder)

EXAMPLE 3 a) Preparation of Tea Extract 1 kg of Sencha (natural leaf tea) was extracted with 10 liter of water at 90° C. under stirring for 1 hour. After filtering off the tea leaves, the filtrate was concentrated to 1 liter. After adding 1 liter of acetone, the resultant mixture was stirred and the insoluble matters thus formed were removed by centrifugation. Next, 1 liter of ethyl acetate was added to the supernatant and the mixture was stirred and then allowed to stand for 30 minutes. The ethyl acetate was recovered and concentrated under reduced pressure. After converting into an aqueous layer, it was freeze-dried to give 97 g of a powder.

b) Preparation of Compounding Ingredient

A 50 g portion of the powder obtained form the tea leaf extract prepared above was treated as in Example 1 to give a compounding ingredient.

c) Similar to the procedure of Example 1, a male dog (Shiba) aged 14 years was fed with 400 g of the dog food once a day for 3 days. Next, the animal was fed with the feed containing the deodorizing compounding ingredient as shown in Table 4 for the subsequent 7 days and the odors of the feces were sensorily evaluated during this period. Table 4 shows the results.

The evaluation was carried out by the same method as EXAMPLE 2.

TABLE 4

| (P1 = tea leaf extract + burdock powder) | | | | | | | | | | |
|---|---|---|---|---|---|---|---|---|---|---|
| Type Age | Sex | Single dose No. of meals | P-1 content | Step 2 day 1 | Step 2 day 2 | Step 2 day 3 | Step 2 day 4 | Step 2 day 5 | Step 2 day 6 | Step 2 day 7 |
| Shiba 14 | F | 400 g 1 | 0.50 | no change | Weakened | weakened | weakened | weakened | weakened | weakened |

EXAMPLE 4

Similar to the procedure of Example 1, a compounding ingredient was prepared. The cats as listed in Table 5 were fed with a cat food for 3 days as stated in Table 5 (the step 1). Next, the animals were fed with the feed containing the compounding ingredient as shown in Table 5 for the subsequent 7 days (the step 2) and the odors of the feces were sensorily evaluated during this period. Table 5 shows the results.

The evaluation was carried out by the same method as Example 2.

TABLE 5

| (P1 = coffee bean extract + burdock powder) | | | | | | | | | | |
|---|---|---|---|---|---|---|---|---|---|---|
| Type Age | Sex | Single dose No. of meals | P-1 content | Step 2 day 1 | Step 2 day 2 | Step 2 day 3 | Step 2 day 4 | Step 2 day 5 | Step 2 day 6 | Step 2 day 7 |
| Japanese cat | | 85 g 2 | 0.01% | no change | Somewhat Weakened | somewhat weakened | somewhat weakened | somewhat weakened | somewhat weakened | somewhat weakened |
| Japanese cat | | 85 g 2 | 0.25% | no change | Weakened | weakened | weakened | weakened | weakened | weakened |

By taking the foods, feeds, pet foods, etc. containing the compounding ingredient as specified in the present invention, the odor of animal excreta can be reduced or eliminated.

Namely, the present invention makes it possible to set free owners of domestic or pet animals and workers taking care of so-called bedridden persons from the odor of the excreta, thus achieving a highly recommendatory effect. In addition, the compounding ingredient according to the present invention can be easily prepared and is less expensive, which makes the present invention further effective.

What is claimed is:

1. A method for reducing or eliminating the odor of animal excreta which comprises feeding the animal with an edible material containing one or more extracts selected from the group consisting of the extracts of rosemary, sunflower seeds, fresh coffee beans, grape pericarp, grape seeds, apple, carrot leaves and tea leaves and an enzyme capable of oxidizing phenolic compounds.

2. The method according to claim 1, wherein the enzyme is selected from the group consisting of polyphenol oxidase, monophenol oxidase, oxidases forming hydrogen peroxide and peroxidases.

3. The method according to claim 1, wherein said enzymes capable of oxidizing phenolic compounds are selected from the group consisting of laccase, tyrosinase, glucose oxidase and peroxidases.

4. A feed containing a compounding ingredient comprising one or more extracts selected from the group consisting of the extracts of rosemary, sunflower seeds, fresh coffee beans, grape pericarp, grape seeds, apple, carrot leaves and tea leaves and an enzyme capable of oxidizing phenolic compounds.

5. The feed according to claim 4, wherein the enzyme is selected from the group consisting of polyphenol oxidase, monophenol oxidase, oxidases forming hydrogen peroxide and peroxidases.

6. The feed according to claim 4, wherein the enzyme capable of oxidizing phenolic compounds are selected from the group consisting of laccase, tyrosinase, glucose oxidase and peroxidases.

7. A pet food containing a compounding ingredient comprising one or more extracts selected from the group consisting of the extracts of rosemary, sunflower seeds, fresh coffee beans, grape pericarp, grape seeds, apple, carrot leaves and tea leaves and an enzyme capable of oxidizing phenolic compounds.

8. The pet food according to claim 7, wherein the enzyme is selected from the group consisting of polyphenol oxidase, monophenol oxidase, oxidases forming hydrogen peroxide and peroxidases.

9. The pet food according to claim 7, wherein the enzyme capable of oxidizing phenolic compounds are selected from the group consisting of laccase, tyrosinase, glucose oxidase and peroxidases.

10. A food containing a compounding ingredient comprising one or more extracts selected from the group consisting of the extracts of rosemary, sunflower seeds, fresh coffee beans, grape pericarp, grape seeds, apple, carrot leaves and tea leaves and an enzyme capable of oxidizing phenolic compounds.

11. The food according to claim 10, wherein the enzyme is selected from the group consisting of polyphenol oxidase, monophenol oxidase, oxidases forming hydrogen peroxide and peroxidases.

12. The food according to claim 10, wherein the enzyme capable of oxidizing phenolic compounds are selected from the group consisting of laccase, tyrosinase, glucose oxidase and peroxidases.

* * * * *